US006788651B1

United States Patent
Brent et al.

(10) Patent No.: US 6,788,651 B1
(45) Date of Patent: Sep. 7, 2004

(54) METHODS AND APPARATUS FOR DATA COMMUNICATIONS ON PACKET NETWORKS

(75) Inventors: Jason B. Brent, Foothill Ranch, CA (US); James W. Johnston, Rancho Santa Margarita, CA (US); Joel D. Peshkin, Irvine, CA (US); Gilles G. Fayad, Corona Del Mar, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/553,773

(22) Filed: Apr. 21, 2000

Related U.S. Application Data

(60) Provisional application No. 60/130,433, filed on Apr. 21, 1999, now abandoned.

(51) Int. Cl.[7] ............................................. H04L 12/28
(52) U.S. Cl. ........................ 370/255; 370/352; 370/401; 370/516; 375/222
(58) Field of Search ................................ 370/352–356, 370/401, 465, 468, 471, 472, 576, 252, 286, 255; 375/222, 346; 379/406.01, 93.01

(56) References Cited

U.S. PATENT DOCUMENTS

| | | | | |
|---|---|---|---|---|
| 5,150,387 A | * | 9/1992 | Yoshikawa et al. ......... 375/122 |
| 5,349,635 A | * | 9/1994 | Scott ............................. 379/97 |
| 5,625,677 A | * | 4/1997 | Feiertag et al. ................ 379/93 |
| 5,875,246 A | * | 2/1999 | Houghton ..................... 379/406 |
| 5,940,479 A | * | 8/1999 | Guy et al. ................. 379/93.01 |
| 6,023,475 A | * | 2/2000 | Tanaka et al. ............... 370/471 |
| 6,055,310 A | * | 4/2000 | Zhang et al. ................ 379/407 |
| 6,069,947 A | * | 5/2000 | Evans et al. ................. 379/229 |
| 6,360,271 B1 | * | 3/2002 | Schuster et al. ............. 709/231 |
| 6,463,135 B2 | * | 10/2002 | Abrishami et al. .... 379/100.01 |
| 6,486,975 B1 | * | 11/2002 | Verreault et al. ............ 358/445 |

* cited by examiner

*Primary Examiner*—Duc Ho
(74) *Attorney, Agent, or Firm*—Farjami & Farjami LLP

(57) ABSTRACT

In accordance with one aspect of the present invention, the detection of voice signals versus modem signals in a data communication system may be conducted, a determination can be made whether existing VoIP algorithm functions or characteristics may be appropriate for modem communications, and then the VoIP algorithms may be modified to improve operating conditions for a modem connection. Additionally, the existing VoIP algorithm functions and network characteristics within the data communication system that may degrade modem performance can be identified prior to the determination of whether the VoIP algorithm functions are appropriate for modem communications. In accordance with another aspect, the detection between voice signals and modem signals can also comprise the determination as to a particular type of modems signal. Further, control of the adaptive jitter buffer to remove or reduce adaptation during detection of modem signals can be provided.

47 Claims, 3 Drawing Sheets

METHODS AND APPARATUS FOR DATA COMMUNICATIONS ON PACKET NETWORKS

CROSS-REFERENCES TO RELATED APPLICATIONS

This is an application claiming priority on a prior Provisional Application, U.S. Serial No. 60/130,433 filed Apr. 21, 1999 now abandoned.

FIELD OF THE INVENTION

The present invention relates to data communications on Packet Networks. More particularly, the present invention relates to the communication of data through peripheral devices, such as fax machines or modems, on Packet Networks; such as Voice Over IP networks.

BACKGROUND OF THE INVENTION

The current trend of using Packet Networks (PN) to transport data traditionally carried over circuit switched networks such as the Public Switched Telephone Network (PSTN) creates a need to support the installed-base of terminals attached to the PSTN. FIG. 2 depicts a traditional PSTN configuration as well as the interfacing to a PN substitute network.

The different nature of these two types of networks translates into different characteristics such as bandwidth, delay and loss of information. The differences in characteristics between these networks can affect the terminals that have been designed with PSTN characteristics in mind, if and when the terminals need to communicate over a PN 204. For example, Packet Network connections differ from the traditional telephone networks for which modems, such as modems 218 and 224, were originally designed. Accordingly, many terminals are delay sensitive, and their interaction has been designed on the delay characteristics of the network in use at the time of their inception, typically, the PSTN.

Further, many of the mechanisms designed to compensate for these differences are designed to make human conversation comfortable. For example, in Voice over Internet Protocol (VoIP) network connections, the VoIP processing is typically conducted in the gateways, for example, IP gateways 210 and 212, located at the edge of the IP network. These VoIP processing algorithms are typically optimized as much as possible for handling voice traffic. However, if this optimization is done without any consideration for modems 218 and 224 within user endpoints 230 and 240, any corresponding modem connections may be greatly degraded or may not function over such a VoIP connection, i.e., the voice processing mechanisms will not facilitate reliable modem communications. Further VoIP connections can tend to create jitter that can destroy modem training and end-to-end connectivity.

In a packet network, individual data packets typically traverse the network with different propagation delays, depending on the routes the packets take within the network and the amount of queued data within the network. A VoIP terminating point in gateways 210 and 212 will typically provide a continuous signal by generally adding a large enough throughput delay to absorb the statistical spread in propagation delay. One option for voice traffic is to provide an adaptive jitter buffer that attempts to minimize the throughput delay by adaptively adjusting to changes in the delay statistics over time as the volume of network traffic increases or decreases. However, this adaptive jitter buffer algorithm can tend to degrade modem performance, particularly in echo canceling modulations like V.90 or V.34. For example, as the jitter buffer adapts, changes in the round-trip delay of the associated echo would be observed. Accordingly, the adaptive algorithms in the echo canceller attempt to track these changes in delay. However, for typical echo canceller adaptation rates used by most modems, it is very unlikely that an echo canceller could adapt quickly enough to track any changes in round-trip delay. As such, a change in the round trip delay as small as 2 or 3 ms is likely to cause a modem, such as a V.34 or V.90 modem, to disconnect over a large proportion of line conditions.

In addition, most modems historically have been designed to tolerate up to 1.2 seconds of round trip delay, such as may have been required for the worst case of two satellite hops, i.e., two satellites encountered within the communication path. However, since current technology has rendered unlikely the possibility of ever seeing two satellite hops, as well as with underwater cable systems having a much lower delay becoming more common, modern modem designs are quite likely to have less round trip delay capability than the old 1.2 second design standards. Accordingly, present IP gateways, particularly those with adaptive jitter buffers optimized for voice communications, cannot resolve alone the problems with present modem communications through VoIP networks.

In addition to the network impairment of throughput delay, another impairment consists of packet loss. When packets are lost during a communication session, attempts can be made by the network to minimize the duration of time that the modem receives an invalid signal, such that the modem simply receives a burst of errors during the period of missing data but continues normally thereafter once the data signal resumes. Most modern modems can be somewhat tolerant to impulsive noise, sudden signal hits or drop-outs. Accordingly, if the duration of time that the modem sees invalid data during a lost packet is small enough, the algorithms that give tolerance to, for example, impulsive noise, sudden signal hits, or drop outs, may keep the modem in a stable condition. However, in the event that the period for the loss of data lasts too long, the adaptive algorithms can be thrown off track, and thus, a retraining of the modem is needed.

Thus, a need exist for new methods for providing reliable data communications through packet networks for voiceband communications other than analog voice communications, such as, for example, fax or modem communications. Further, a need exist for a method to improve the throughput delay and packet loss impairments present over IP networks. Additionally, a need exist to facilitate the detection of different types of voiceband traffic, for example, detecting voice versus different modem/fax modulations, and for disabling network voice echo cancellers, adaptive jitter buffers and other such mechanisms implemented in the VoIP algorithms that would degrade modem performance.

SUMMARY OF THE INVENTION

In accordance with one aspect of the present invention, typical VoIP algorithm functions and network characteristics that may degrade modem performance are identified, and a determination is made whether these functions or characteristics may be modified with suitable VoIP algorithms, primarily in the IP gateways to improve conditions for a modem connection.

The disclosed techniques for facilitating data communications may be employed through the use of modems over a packet network. In accordance with an exemplary embodiment of the present invention, the detection of voice signals versus modem signals in a data communication system is conducted, a determination is made whether existing VoIP algorithm functions or characteristics may be appropriate for modem communications, and then the VoIP algorithms may be modified to improve operating conditions for a modem connection. Additionally, the existing VoIP algorithm functions and network characteristics within the data communication system that may degrade modem performance can be identified prior to the determination of whether the VoIP algorithm functions are appropriate for modem communications.

In accordance with one aspect of the present invention, the detection between voice signals and modem signals can also comprise the determination as to a particular type of modems signal. Further, a variety of signals can be utilized to determine whether voice or modem communications are being conducted. Still further, control of the adaptive jitter buffer to remove or reduce adaptation during detection of modem signals can be provided.

In accordance with another aspect, the modification of the VoIP algorithms may occur within gateway modems suitably interfaced to the packet network, or can occur within originating and answering modems. Moreover, the modifications can be selectively configurable based on the type of modem signal detected. In accordance with an exemplary embodiment, the VoIP algorithms, as modified for modem communications, select their fixed buffer delay before the modem round trip delay calculation is completed, thus ensuring that the packet network jitter compensation buffer is correctly compensated for in the bulk delay buffers of the originating and answering modems located at the extreme endpoints of the connection.

In accordance with another aspect of the present invention, a sequence of operation is suitably provided that allows introduction of compression for voice traffic. Accordingly, several advantages include the ability to keep data fax and voice on the same network and to support switching between data, fax and voice within the same call, all while optimizing VoIP processing such as by substantially reducing the effects of packet loss impairment over packet networks.

BRIEF DESCRIPTION OF THE DRAWING

A more complete understanding of the present invention may be derived by. referring to the detailed description and claims when considered in connection with the figures, where like reference numbers refer to similar elements throughout the figures, and:

DETAILED DESCRIPTION OF PREFERRED EMBODIMENTS OF THE INVENTION

The present invention may be described herein in terms of functional block components and various processing steps. It should be appreciated that such functional blocks may be realized by any number of hardware or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of data communication contexts over packet networks, such as, for example, modem or fax communications and the like, and that the IP communication system described herein is merely one exemplary application for the invention. Further, it should be noted that the present invention may employ any number of conventional techniques for data transmission, training, signal processing and conditioning, and the like. Still further, it should be appreciated that the algorithms described herein are not limited to gateways, but may be used with other features in packet networks. Such general techniques that may be known to those skilled in the art are not described in detail herein.

Figure 1:
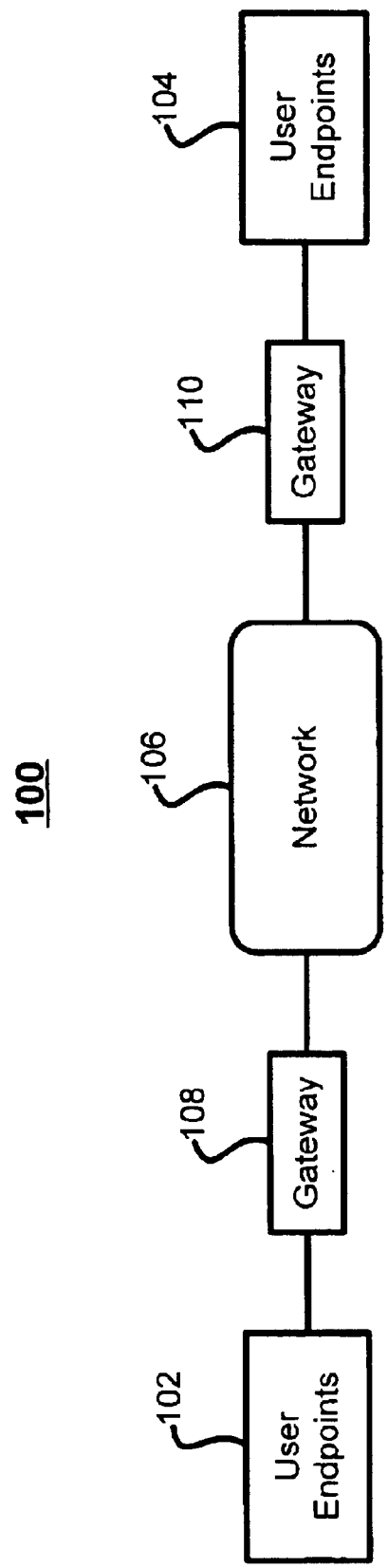
FIG. 1 is a schematic representation of a data communication system in accordance with the present invention.
Figure 2:
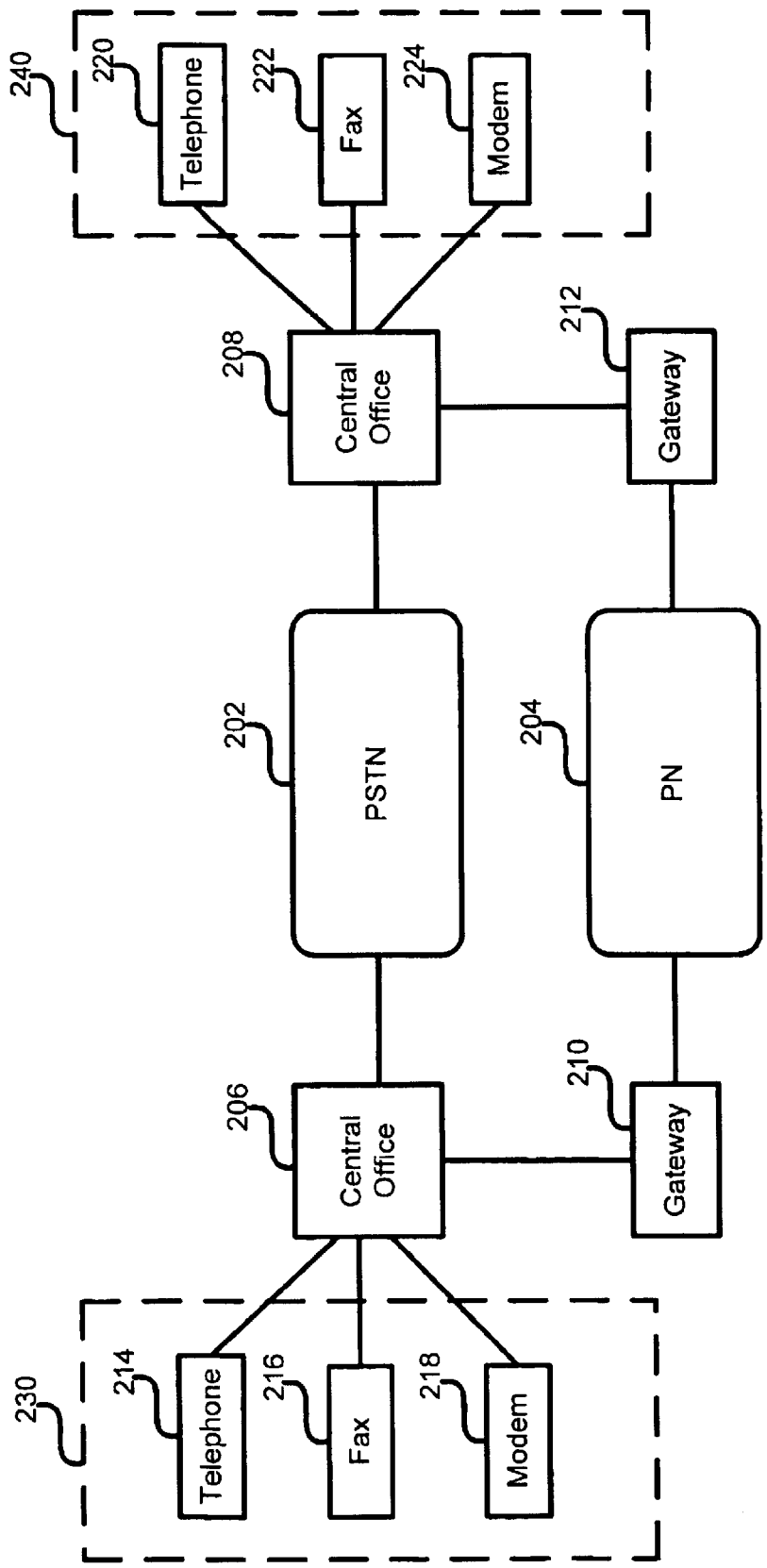
FIG. 2 is schematic representation of a data communication system in which a various embodiments of the present invention may be utilized.

With reference to FIG. 1, in accordance with an exemplary application of the present invention, a packet network communication system 100 may include a packet network 106, user terminals 102 and 104, and a pair of gateways 108 and 110. Packet network 106 preferably comprises any packet network for providing the transporting of data. In accordance with one embodiment, packet network comprises a Voice over Internet Protocol (VoIP) network. In addition, packet network 106 can be configured in various packet formats, such as, for example, TCP/IP or other IP packet network formats, ATM cell formats, or relay frames and the like.

Terminals 102 and 104 are preferably configured as an originating endpoint 102 and an answering endpoint 104. However, terminals 102 and 104 can also be configured in reverse, i.e., with terminal 104 comprising an originating endpoint and terminal 102 comprising an answering endpoint. Accordingly, terminals 102 and 104 attempt to communicate with each other through a packet network 106. Preferably, terminals 102 and 104 include originating and answering modems to facilitate modem communications, such as, for example, handshaking protocols and the like, i.e., modem communications can be facilitated between originating and answering modem devices located within endpoints 102 and 104. However, terminals 102 and 104 can also comprise originating and answering fax machines and the like.

Gateways 108 and 110 preferably comprise IP gateways suitably connected within packet network 106. In addition, gateways 108 and 110 are configured with a protocol suitable for communicating with packet network 106. For example, when packet network 106 comprises a VoIP network, gateways 108 and 110 can include a Voice over IP processing algorithm function. Accordingly, when packet network 106 comprises any other network, such as Vo ATM network and the like, gateways 108 and 110 can include a suitable processing algorithm function, such as Voice-over-ATM. Moreover, gateways 108 and 110 are suitably located at the ingress and egress points of packet network 106, with originating endpoint 102 at the ingress of packet network 106 and answering endpoint 104 at the egress of packet network 106. Accordingly, packet network 106 can facilitate a communication connection between terminal 102 and terminal 104 through the transporting of data information between gateways 108 and 110. Further, although the transporting of data information could utilize demodulation techniques that can provide a more efficient utilization of the packet network bandwidth, in accordance with a preferred exemplary embodiment, the data information is transported across packet network 106 without demodulation of the data information to a digital signal. Accordingly, various cost advantages that may be realized.

Moreover, to facilitate communications between terminals 102 and 104 and gateways 108 and 100, packet network communication system 100 may also include central offices, such as central offices 206 and 208, configured between terminals 102 and 104 and gateways 108 and 110. In accordance with this aspect, central offices 206 and 208 can assist a terminal, such as terminal 102, in connecting to a suitable gateway, such as gateway 108, to communicate over packet network 106. Further, central offices 206 and 208 may provide suitable conversion techniques to reconfigure any signals delivered by terminals 102 and 104 for transport over packet network 106.

During operation of packet network 106, the data information communicated between terminals 102 and 104 is generally presumed by packet network 106 to be in the form of a voiceband signal, such as, for example, any signal generated by any "POTS" customer equipment. For example, the voiceband signal may comprise analog information content completely contained within a 4 kHz bandwidth, such as from 0-to-4 kHz, such that the voiceband signal is suitable for transmission across a digital telecommunications network such as packet network 106. Moreover, the voiceband signal may be suitably converted in central offices 206 and 208 to standard digitally encoded signals, such as, for example, ITU Recommendation G 711, 64 kbit/s PCM signal with an 8 kHz sample rate.

Additionally, the voiceband signal may be suitably configured as a voice signal or a modem signal. In accordance with this aspect, a voice signal may comprise a traditional waveform representing the conversion of a human voice signal to an electrical voltage through a microphone-type device, such as, for example, a conventional telephone handset.

Meanwhile, a modem signal may comprise any digital signal that can be modulated to a voiceband signal and then demodulated back to a digital signal, such as by fax or modem devices located within endpoints 102 and 104. For example, a modem or fax signal can encompass any ITU-standard modem and fax modulations, or any other proprietary modulations such as VFC, K56 and the like.

Additionally, a modem or fax signal may comprise any voiceband modem or fax signal. Accordingly, a modem signal may comprise any conventional modem signal, such as a PCM signal, e.g., V90 or K56, a QAM echo canceling signal, e.g., V34, V32, or VFC, or a non-echo canceling signal, e.g., V27, V29, or V22. Moreover, a fax signal may comprise any conventional fax signal, such as, for example, a class 1, class 2, or V17, V27, V29, and V34 signals and the like. Still further, a fax signal can be configured to be a subset of the general class of modem signals, which are modulated data signals.

As discussed above, prior art packet networks typically provide mechanisms configured to compensate for differences between the packet network and a public switched telephone network to make human conversation as comfortable as possible. Accordingly, typical Voice over IP processing algorithms are configured for optimizing voice signals without consideration for modem communications.

However, in accordance with the present invention, a method and apparatus is provided for also facilitating more reliable modem communications as well as voice communications. In accordance with one embodiment of the present invention, a method for providing more reliable modem communications suitably comprises the steps of detecting for the presence of modem signals within the packet network communication system and then providing a modified Voice over IP processing algorithm for optimizing the modem signals.

Figure 3:
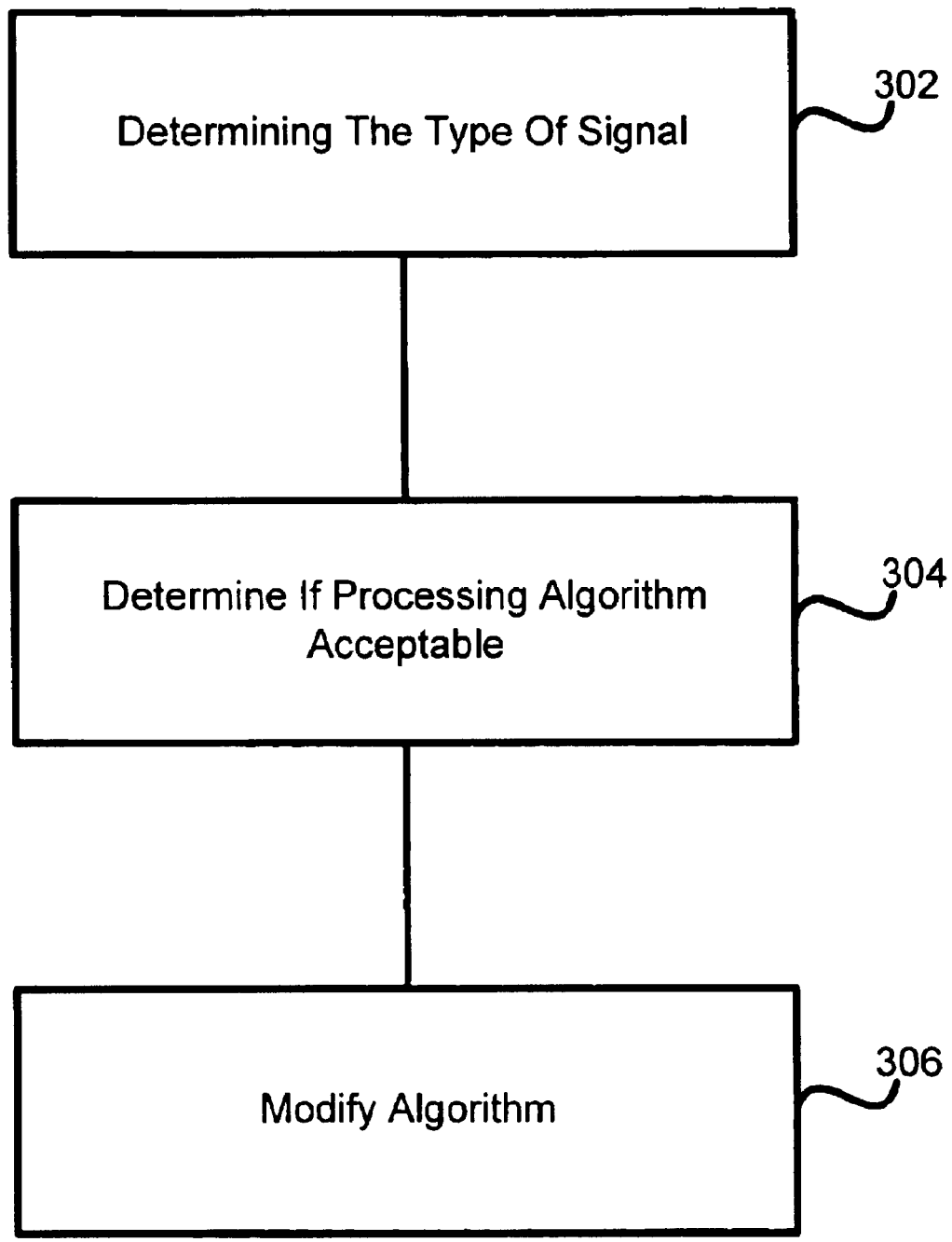
FIG. 3 is a flow chart for an exemplary algorithm in accordance with a preferred embodiment of the present invention.

With reference to FIG. 3, in accordance with an illustrative embodiment, a method for providing more reliable modem communications comprises a step 302 for detecting whether the voiceband signal is a voice signal or a modem signal. In accordance with one aspect, detection step 302 can comprise the determination of whether the voiceband signal is a voice signal or modem signal as described above.

Additionally, detection step 302 can also comprise the determination of a particular type of modem signal, i.e., a determination of whether the modem signal is, for example, a PCM signal, a QAM echo canceling signal, a non-echo canceling signal, or any conventional fax signal, such as, for example, a class 1, class 2, or V17, V27, V29, and V34 signals and the like. In accordance with this aspect, as will be described in more detail below, detection step 302 can thus facilitate the implementation of different processing algorithms for the various types of modem signals to allow the communication network to realize a more reliable and higher data throughput performance for the various modem signals.

Additionally, detection step 302 can utilize a variety of signals present within packet network communication system 100. Preferably, detection step 302 can include an in-band signal detection process, such as, for example, using answer tones or fax calling tones. This aspect of detection step 302 is particularly preferable when the existing IP protocols provide minimal information corresponding to the type of voiceband signal being transported through packet network 106.

For example, detection step 302 could detect in gateways 108 or 110 an in-band signal such as a V.25 answer tone with or without phase reversals. If detected, packet network communication system 100 could disable various echo canceling functions, as will be described below. Additionally, detection step 302 could detect in gateways 108 or 110 an in-band signal such as a fax calling tone and the like.

Although the detection of in-band tones may be preferable for its simplicity and low cost, detection step 302 can also utilize more complex detection schemes to determine the exact modulation scheme being used. Such complex schemes could include the algorithms that are generally used within modem devices for providing automode detection. For example, detection in gateways 210 and 212 of an 1800 Hz tone transmitted from the modem at one user terminal 102 or 104, with a corresponding pair of 600 Hz and 3000 Hz tones being transmitted from the other user terminal, could be used to indicate that a V.32 modem connection is starting to take place between user terminals 102 and 104. As another example, if a V8 FSK handshaking protocol configured between terminal modems 102 and 104 was demodulated in gateway 108 or 110, the detected data information could be used to determine whether a V.34 or V.90 modem connection was about to take place across packet network communication system 100.

The operation of such demodulation/detection algorithms used in gateways 210 and 212 to detect the type of voiceband signal could comprise very similar features as the automode algorithms used in most modems today. However, while modems 218 and 224 or fax machines 216 and 222 are actively participating in the initial handshaking and automode procedures between each other, gateways 210 and 212 would have to monitor or "snoop" the automode signals to make its determination as to the type of voiceband signal. This monitoring would be possible since these automode signals comprise half-duplex or split-band signals between terminals 102 and 104. Accordingly, the data information transmitted through the automode handshaking protocols from each of the terminals 102 and 104 could be observed individually by gateways 108 and 110 to detect for the presence of modem signals.

As an additional example, data information contained in a V8 handshaking protocol could indicate that a V90 modem connection is about to take occur within packet network communication system 100. Still further, the detection that such a V90 modem connection is being planned could be used to enable unique VoIP processing algorithms to increase the reliability of V90/PCM modem communications over the IP network 204.

With continued reference to FIG. 3, in accordance with an illustrative embodiment, a method for providing more reliable modem communications may also comprise a step 306 for providing a modified processing algorithm in a packet network communication system 100, such as a VoIP network communication system. In accordance with one embodiment, step 306 may comprise the implementation of a modified algorithm within a Voice over IP" processing function in IP gateways, such as gateways 108 and 110. For example, the processing of modem signals through an IP network, such as by using a Voice over IP network protocol, can be conducted with the algorithms at gateways 108 and 110 modified to facilitate more reliable modem connections.

In accordance with another embodiment, step 306 may comprise the implementation of a modified algorithm within originating and answering endpoints 102 and 104, such as by implementation in modems included within endpoints 102 and 104, to directly compensate for VoIP network impairments, or to improve modem performance or connection reliability. Accordingly, step 306 may comprise the implementation of a modified algorithm within gateways 108 and 110, within modems of endpoints 102 and 104, or a combination of the two configurations.

Further, the implementation of a modified algorithm can include the integration of additional algorithm functions into the existing VoIP processing algorithm, or alternatively, can include the implementation of a newly modified algorithm to suitably replace the existing VoIP processing algorithm during modem communications. Further, the modified VoIP algorithms, for example, those within gateways 210 and 212, could be used to provide information to the higher level protocols or network management functions within IP network 106, to assist in modifying dynamically the quality of service parameters, e.g., queuing delay or discarding ability, for the communication session. Accordingly, this process could take into account the different needs of the type of voiceband traffic as it changes between voice, modem, or fax signals during a communication session.

Still further, the implementation of a modified algorithm could be selectively configurable based on the type of modem signal detected in step 302. For example, depending on whether a PCM signal, a QAM echo canceling signal, a non-echo canceling signal, or any conventional fax signal was detected in step 302, a suitably configured modified algorithm could be provided in step 306 to optimize the modem communications based on the type of modem signal detected.

In addition, a suitably configured modified algorithm could provide optimization based on the phase of the communication. For example, gateway 108 and 110 could detect the difference between the modem training and data mode phases of the connection, such that packet network 106 could be reconfigured to provide additional protection against packet loss during the modem training, as compared with the data mode phase. This result would be desirable since a fax or modem connection in data mode can be somewhat tolerant to drop-outs, signal hits or impulsive noise and the like, whereas a small data loss occurring at the wrong location during modem training could cause a complete failure to connect modems 102 and 104 together.

In accordance with another embodiment, a method for providing more reliable modem communications may also comprise an intermittent step 304, i.e., an additional step in between steps 302 and 306, for determining whether the existing VoIP processing algorithm is appropriate for modem communications. For example, in the event that the existing VoIP processing algorithm has characteristics that are configured specifically for voice which could detrimentally affect the modem communications, then step 304 could indicate to step 306 that a modified algorithm should be implemented. However, if the characteristics of the existing VoIP processing algorithm may only affect the modem communications in a minimal manner, then step 304 could indicate to step 306 that no modification, or alternatively, only a minimal modification, is recommended to the existing VoIP processing algorithm.

Step 306 for providing a modified processing algorithm can be suitably configured to optimize the modem signals present in a packet network. As discussed above, a packet network, such as a VoIP network, can cause various network impairments, such as additional throughput delay and occasional packet loss. However, the existing VoIP algorithms can be modified to resolve these impairments in a manner that minimizes the impact on modem communications, such as the potential impact on a relatively large installed base of modems or fax machines. Preferably, these network impairments can be translated into a form that the modems or fax machines are configured to readily resolve with their existing functions.

IP Network Impairments—Throughput Delay

In accordance with one embodiment for dealing with throughput delay, the behavior of the adaptive jitter buffer can be suitably modified. Preferably, the jitter buffer settings can be suitably configured to expect a more delayed signal with modem communications than would be utilized for voice communications. Moreover, this modified delay signal can be realized through multiple methodologies and is not limited to any one method for providing such a delay signal.

For example, the delay can be computed as an offset delay relative to the jitter buffer delay setting that would have been used for a voice call. Preferably, the delay is configured significantly larger than the jitter buffer delay would be for the same delay statistics for a voice call. For a voice call, the preferred method to provide the highest quality is to adaptively adjust the delay to match the changing delay statistics in the network, in an attempt to keep the propagation delay as small as possible. This premise is based on the assumption that the smaller the delay, the better the voice quality. However, this assumption is not necessarily true for a modem or fax signal. Generally, modem modulations are somewhat tolerant to propagation delay, usually as a result of their response to satellite delay impairments that could be encountered within an PSTN connection. Additionally, echo canceling modems have a definite limit on the round trip delay they can tolerate, e.g., the sum of the propagation delays from user endpoints 102 to 104 plus any delays from endpoints 104 to 102, that results from the need to cancel any existing far echo as well as provide the bulk delay storage of all transmitted data in a manner that spans the round trip delay in internal memory. Far echo is an echo reflected from the far end of the network, such as at the 2-to-4 wire conversion point in a remote central office. The far echo traverses the packet network twice, and is thus delayed by the jitter buffer delays in both directions.

In accordance with this aspect, communication system 100 may also include a satellite link configured between user endpoints 102 and 104, outside packet network 106. Accordingly, the preferred length of buffering delay in gateways 106 and 108 would be to add the minimum safe delay that is configured to provide that no packets would arrive too late. Further, in the event that more sophisticated modulation detection algorithms were used to detect echo canceling versus non-echo canceling modes, then a longer buffering delay could be applied to the non-echo canceling modes, including fax, which do not need to cancel the far echo, and thus are not limited by the size of their bulk delay storage.

Further, the jitter buffer may be preferably configured to resist dynamic adjustment to its operating characteristics, such as, for example, by freezing the delay of the jitter buffer or by establishing a more difficult threshold for further adjustments. In accordance with a preferred embodiment, the jitter buffer delay can be suitably frozen as soon as a modem connection is detected, for example, by detection of various signals, such as V.25, calling tone or answer tone. Thereafter, an additional fixed delay can be provide which is sufficiently determined large enough to absorb all variations in propagation delay, thus preventing virtually all packet loss impairments caused by late arriving packets.

Accordingly, the modified delay could be configured to correspond to a fixed large amount of buffering. In accordance with a preferred embodiment, during operation of modem communications over an VoIP network, changes or modifications to the jitter buffer delay should be made in multiples of 6 PCM samples at 8 kHz sample rate, (6*125 us)=750 us. This uniform change to the jitter buffer delay can prevent potential phase shifts in PCM modem robbed bit patterns, particularly for PCM modem connections where a sudden change in propagation delay and a sudden degradation of the far echo canceller performance doesn't in itself cause a retrain.

Moreover, the jitter buffer delay can also be configured to take into account the maximum delays for which client modems in endpoints 102 and 104 can provide during communications. For example, by utilizing as small as possible, but safe delay that virtually guarantees that no packets arrive too late, the modifying algorithm can allow packet network 100 to tolerate other delays, such as, for example, satellite delays. In accordance with this embodiment, the modifying algorithm to set the fixed jitter buffer delay for a modem call could require the maximum allowable delay. As such, it is preferable that VoIP network 106 provide not more than about 250 ms for the jitter buffer. Further, in accordance with this aspect, it is preferred for the algorithm protocol not to request retransmissions when voice or modem packets arrive with errors so as to keep this jitter buffer delay within acceptable bounds.

As discussed below, modern modem designs typically have less than 1.2 second round trip delay capabilities. One approach to maximize connectivity with modems is to add the smallest safe delay to the jitter buffer delay, as described above. However, since this smallest safe delay is usually determined at the beginning of the communication session, in the event that network traffic increases during the call session, thus changing the delay statistics from the original assumptions, an unacceptable number of packets may arrive too late and be lost. Further, as described above, gradual jitter buffer adaptation proves unacceptable for a modem connection.

However, in accordance with an embodiment of the present invention, the VoIP algorithm, which is preferably configured to monitor packet delay statistics, can determine that the jitter buffer delay should be suitably increased. Upon such a determination, the VoIP algorithm preferably increases the jitter buffer delay to a new, safely large enough delay, for example, up to 60 ms more than the previous delay, while keeping the total delay less than the preferred maximum for that network, for example, approximately 250 ms. As a result, virtually all late packet loss under the new network conditions can be prevented. Accordingly, any standard modem error recovery procedures in modems within endpoints 102 and 104 could effectuate a single retrain to the new larger delay, rather than needing frequent retrains as may be required with a gradual jitter buffer adaptation.

One problem that generally occurs with the addition of the extra delay to the jitter buffer, and thus the overall delay of the communication connection, is the introduction of echo problems for corresponding voice communications, which may require the addition of a voice-grade network echo canceller in the VoIP algorithms at the gateways 108 and 110. In a preferred embodiment for voice communications, the performance of such echo cancellers would preferably be configured to match or exceed the requirements of the ITU G.165 and any other relevant standards. However, these voice grade echo cancellers do not provide good enough cancellation of a modem signal for optimum performance. The cancellation of this echo for modem signals is preferably performed by the far echo canceller in the originating and terminating endpoint modems.

As a standard practice, echo canceling modulations typically send an ITU V25 answer tone with phase reversals to disable the voice grade echo cancellers in the PSTN, thus allowing any modem to conduct its own far echo cancellation. Accordingly, utilizing this feature, the modified algorithm is preferably configured to disable the network echo cancellers. In accordance with this aspect, upon detecting an in-band signal, such as a V25 answer tone with phase reversals, any voice-grade network echo cancellers implemented in the VoIP processing of the gateways 108 and 110 can be disabled. Preferably, the VoIP algorithms in gateways 108 and 110 will detect in-band signal and operate to disable their corresponding echo cancellers. This disabling procedure may include any standard procedure for voice-grade network echo cancellers, such as ITU standard G165. Additionally, the in-band signal can facilitate the disabling of any network echo cancellers, such as the network echo cancellers in the switched portion of the network.

This echo cancellation disabling process could also be realized from the detection of other in-band signals. For example, the detection of V25 answer tone without phase reversals could indicate the presence of a modem signal within packet network 106, and thus could trigger the disabling of any echo suppressors in packet network 106 conforming to ITU Recommendation G.164. Additionally, any similar echo suppressor functions existing in the VoIP algorithms could be disabled.

IP Network Impairments—Packet Loss

As described above, while existing modems can be tolerant to impulsive noise, sudden signal hits, or drop-outs resulting in packet loss, in the event that the period for loss of data lasts too long, the adaptive algorithms can be thrown off track, and thus, a retraining of the modem is generally needed. However, in accordance with various embodiments of the present invention as described above, by adjusting the settings of the jitter buffer delay properly, the VoIP algorithms can be particularly effective in preventing packet loss caused by packets arriving too late. Accordingly, the packet loss impairments are significantly reduced by the modification of the behavior of the adaptive jitter buffer. However, packet loss in IP networks is often caused by routers or nodes within the network which discard the packets. This packet loss generally occurs during times of heavy traffic when there is essentially no space left in the storage buffers. Additionally, packets that develop data errors when passing through the packet network may be discarded. Accordingly, there exists a need to reconstruct the missing data in a way that provides for more reliable fax or modem connections.

However, in accordance with a preferred embodiment, additional improvements may be realized through modifying the VoIP processing algorithms to reconstruct missing packet data, and thus to optimize the data for the particular modem or fax signal. For example, the V29 signal constellation used for fax transmissions, originally designed to be robust to phase jitter, may perform best with repeated packets, which would appear like two phase hits, one at the beginning and one at the end of the replayed packet. On the other hand, other modulations, like V32 and the like that may be more tolerant to drop-outs than phase hits, may play out the silence of missing data. In accordance with one aspect of this embodiment, further improvements can be realized by carefully optimizing the packet length for the particular network packet loss statistics. For example, shorter packets randomly discarded will cause a shorter disturbance to the modem signal, and thus it can be easier for the modem to deal with the missing data using its standard algorithms for handling drop-outs, signal hits, or impulsive noise and the like. Further, if the packet loss impairment is too severe for the VoIP algorithms in the network to disguise as regular PSTN impairments, then changes can be made to the modem signals and algorithms at user endpoints 102 and 104 to facilitate more reliable modem or fax connections. Moreover, the modem algorithms can be tuned for increased stability with packet reconstruction techniques, for example, replaying previous packets, inserting silence or inserting noise techniques, that can appear to the modem receiver like phase hits, drop outs, or impulsive noise, respectively. Further, V32 modems can be tuned to work successfully over cellular phone connections, when long severe drop-outs lasting over 1 second can occur.

In accordance with another aspect, the VoIP algorithms can be suitably configured to play-out, i.e., process, any actual packet data transferred, even with incorrect or missing data. As such, if the Cyclic Redundancy Check (CRC) on the packet data is incorrect, likely to be a few bit errors, the VoIP algorithms can preferably play-out this packet data, regardless of what these bit errors comprise, rather than try to reconstruct the data using various techniques designed for Voice processing. Further, the packet data for modem or voice signals would not be protected by the CRC, since any data that arrives will be played out anyway, with only the packet header protected by the CRC. In the event that the header is wrong, deliver to the correct destination cannot be guaranteed, so the corresponding packet would have to be discarded. With regard to the missing data, for example, if a 20 ms data packet arrives late, such as 5 ms after the VoIP algorithm was originally configured to start playing the data packet out, then there exists 15 ms of useful data that can be used. Accordingly, by minimizing the lost data to 5 ms and continuing, rather than discharging all 20 ms and risking a retrain, the probability of keeping the modem connection stable can be increased.

In accordance with yet another aspect, the VoIP algorithms can be suitably configured to reconstruct the missing information utilizing interpolation techniques. For example, when missing data is recognized, the VoIP algorithm may replace the missing data with a zero. This use of a zero replacement can be preferably to the modems that missing data because the zero would preferably appear like a drop-out, and thus may be handled more predictably with the existing modem drop-out detection routines. Moreover, the requirements for interpolating lost data may be different for modem calls than for Voice calls.

For example, in voice interpolation, state of the art techniques typically use non-linear methods that maintain qualities of pitch and the like that are more pleasing to the human ear, than those having drop-outs or noise. However, modem receivers are more tolerant to simpler reconstruction techniques that more closely mimic impairments seen on PSTN connections. Thus, inserting silence would appear as a drop-out to a modem, while inserting noise would appear as impulsive noise. Further, replaying the previous packet would appear like two phase hits, one to replace the data at the beginning and one at the end of the replayed packet. In that modems can be configured to have some tolerance to impulse noise, drop-outs or phase hits, essentially problems with the missing data can be resolved.

In accordance with another aspect, different packet networks have different packet loss statistics. For example, Corporate packet networks used to replace existing TDM networks are typically configured to support all legacy services, with an equivalent quality of service as the TDM network. Accordingly, the resources of the packet network can be configured to provide whatever quality of service feature is required. For example, a very low packet loss rate could be specified to support all types of fax or modem connections. Moreover, to reduce the requirement for such a low packet loss rate, and thus ease the specification for the packet network, a preferred embodiment provides for IP gateways 108 and 110 to detect precisely the modem or fax modulation that is being negotiated at any given time. Thereafter, this detected information could be provided to higher level protocols or network management functions to dynamically adjust the quality of service parameters for the connection. As a result, during train-up of modem or fax signals, which generally lasts but a few seconds, the packets could be protected with a very low or essentially zero probability of discarding. Further, in data mode, packet loss rates of 0.1% may be tolerable, providing a low error rate and no loss of synchronization in the modem. Thus, relaxing the packet loss requirement for packet network 106 in this way could considerably cut the cost of the network infrastructure. Similarly, over a network such as the Internet, where no control may be available over Quality of Service settings for an individual call, packet loss rates can be reduced during modem train-up by using redundancy techniques, or possibly redundancy combined with interleaving techniques. Such a method of adaptively controlling Quality of Service may be preferable in some networks for low cost and simplicity of implementation, since the method can be entirely handled in the gateways without any interaction with higher layer protocols or the Network Management Quality of Service function.

However, recent studies suggest that IP networks have a bursty packet loss, often spanning several adjacent packets, with an overall packet loss rate of between 1% and 6%. These packets are thus lost in an IP network and cannot be recovered by extending the jitter buffer delay. Thus, multiple errors can occur every second for a modem or fax connection over the Internet, making it unlikely that any modem or fax could ever reliably connect under such conditions using existing VoIP algorithms. In accordance with a preferred embodiment, to reduce the packet loss rate seen by the modems, redundancy of transmission across the IP network is suitably provided. In other words, the same packet can be sent more than once, at least being sent often enough to provide a high probability of successful connection. The number of any such retransmissions required could depend on the network statistics. Also, the longer the bursts of lost packets, the more likely it is for the modem to go unstable. Additionally, Interleaving aspects could also be utilized in sending packets across IP network 106 between gateways 108 and 110 to randomize the burst errors and thus reducing the maximum loss of signal down to one or two packet lengths.

The present invention has been described above with reference to a preferred embodiment. However, those skilled in the art will recognize that changes and modifications may be made to the preferred embodiment without departing from the scope of the present invention. For example, the various algorithms may be implemented in alternate ways depending upon the particular application or in consideration of any number of other factors associated with the operation of the system. Further, for example, the present invention is not limited to signals of 4 kHz bandwidth, and may equally apply to wideband signals. In addition, the techniques described herein may be extended or modified for use with other components in a data communication system. These and other changes or modifications are intended to be included within the scope of the present invention.

We claim:

1. A method for the communication of data signals through a packet network initialized for voice communication, said method comprising the steps of:
   determining whether the data signals comprise voice signals or modem signals; and
   modifying settings in an adaptive jitter buffer if modem signals are detected to optimize modem communications;
   wherein said adaptive jitter buffer has a dynamic size and an adjustment threshold for changing said dynamic size, and said step of modifying includes defining said adjustment threshold such that said dynamic size changes less often in said data mode configuration than in said voice mode configuration.

2. The method of claim 1, wherein said step of determining whether the data signals comprise modem signals includes the detection of in-band signals.

3. The method of claim 1, wherein said step of determining whether the data signals comprise modem signals includes the utilization of automode signals.

4. The method of claim 1, wherein said step of determining whether the data signals comprise modem signals includes a determination of the type of modem signal.

5. The method of claim 4, wherein said step of modifying settings in said adaptive jitter buffer based on the determination of the type of modem signal.

6. The method of claim 1, wherein the modification of said settings within said adaptive jitter buffer is configured to provide a delay signal for modem communications greater than an existing delay signal for voice communications.

7. The method of claim 1 further comprising a step of disabling of echo cancellers within a switched portion of said packet network.

8. The method of claim 7, wherein said step of disabling of said echo cancellers is performed within a least one gateway.

9. The method of claim 1 further comprising a step of optimizing data packet length.

10. The method of claim 1 further comprising a step of processing of actual packet data including missing packets.

11. The method of claim 1 further comprising a step of reconstructing missing packet data using interpolation.

12. A method of reconfiguring a first gateway device in voice mode configuration to data mode configuration, said first gateway device being in communication with a second gateway device over a packet network, said first gateway device being in communication with a first endpoint device over a first telephone line and said second gateway device being in communication with a second endpoint device over a second telephone line, said first gateway device including a jitter buffer, said method comprising:
   determining whether a signal received by said first gateway device, in said voice mode configuration, is a voice signal or a data signal; and
   configuring said first gateway device to said data mode configuration if said determining determines that said signal is said data signal;
   wherein said jitter buffer has a different configuration in said data mode configuration than in said voice mode configuration, and wherein said different configuration includes said jitter buffer having a dynamic size an adjustment threshold for changing said dynamic size, and wherein said adjustment threshold is defined such that said dynamic size changes less often in said data mode configuration than in said voice mode configuration.

13. The method of claim 12, wherein said jitter buffer causes a jitter buffer delay, and wherein in said data mode configuration, an extra delay is added to said jitter buffer delay.

14. The method of claim 13, wherein said determining further determines whether said data signal indicates a non-echo canceling data modulation or an echo canceling data modulation, and said configuring sets said extra delay to be higher for said non-echo canceling data modulation than for said echo canceling data modulation.

15. The method of claim 13, wherein said extra delay is defined based on a maximum allowable delay by said first endpoint device.

16. The method of claim 12, wherein said jitter buffer causes a jitter buffer delay, and wherein in said data mode configuration, said jitter buffer delay is adjusted dynamically in multiple of a predetermined number of samples.

17. The method of claim 16, wherein said jitter buffer delay is adjusted dynamically in multiple of six (6) PCM samples.

18. The method of claim 12, wherein said jitter buffer causes a jitter buffer delay, and wherein in said data mode configuration, said jitter buffer delay is adjusted and said first endpoint device retrains.

19. A first gateway device for use in voice mode configuration and data mode configuration, said first gateway device being in communication with a second gateway device over a packet network, said first gateway device being in communication with a first endpoint device over a first telephone line and said second gateway device being in communication with a second endpoint device over a second telephone line, said first gateway device comprising;
- a processor capable of determining whether a signal received by said first gateway device, in said voice mode configuration, is a voice signal or a data signal, and configuring said first gateway device to said data mode configuration if said determining determines that said signal is said data signal; and
- a jitter buffer, wherein said jitter buffer is configured by said processor to have a different configuration in said data mode configuration than in said voice mode configuration, and wherein said different configuration includes said jitter buffer having a dynamic size and an adjustment threshold for changing said dynamic size, and wherein said adjustment threshold is defined such that said dynamic size changes less often in said data mode configuration than in said voice mode configuration.

20. The first gateway device of claim 19, wherein said jitter buffer causes a jitter buffer delay, and wherein in said data mode configuration, an extra delay is added to said jitter buffer delay.

21. The first gateway device of claim 20, wherein said processor further determines whether said data signal indicates a non-echo canceling data modulation or an echo canceling data modulation, and configures said extra delay to be higher for said non-echo canceling data modulation than for said echo canceling data modulation.

22. The first gateway device of claim 20, wherein said extra delay is defined based on a maximum allowable delay by said first endpoint device.

23. The first gateway device of claim 19, wherein said jitter buffer causes a jitter buffer delay, and wherein in said data mode configuration, said jitter buffer delay is adjusted dynamically in multiple of a predetermined number of samples.

24. The first gateway device of claim 23, wherein said jitter buffer delay is adjusted dynamically in multiple of six (6) PCM samples.

25. The first gateway device of claim 19, wherein said jitter buffer causes a jitter buffer delay, and wherein in said data mode configuration, said jitter buffer delay is adjusted and said first endpoint device retrains.

26. A method for the communication of data signals through a packet network initialized for voice communication, said method comprising the steps of:
- determining whether the data signals comprise voice signals or modem signals; and
- modifying settings in an adaptive jitter buffer if modem signals are detected to optimize modem communications;
- wherein said step of modifying includes setting said adaptive jitter buffer to a dynamic size in said voice mode configuration and to a fixed size in said data mode configuration.

27. The method of claim 26, wherein said step of determining whether the data signals comprise modem signals includes the detection of in-band signals.

28. The method of claim 26, wherein said step of determining whether the data signals comprise modem signals includes the utilization of automode signals.

29. The method of claim 26, wherein said step of determining whether the data signals comprise modem signals includes a determination of the type of modem signal.

30. The method of claim 29, wherein said step of modifying settings in said adaptive jitter buffer based on the determination of the type of modem signal.

31. The method of claim 26, wherein the modification of said settings within said adaptive jitter buffer is configured to provide a delay signal for modem communications greater than an existing delay signal for voice communications.

32. The method of claim 31, wherein the modification of said greater delay signal within said adaptive jitter buffer is provided by freezing said existing delay signal and adding a fixed delay adapted to absorb variations in propagation delay.

33. The method of claim 32, wherein said additional fixed delay corresponds approximately to a multiple of 750 $\mu$s to prevent potential phase shifts in PCM modem robbed bit patterns.

34. The method of claim 32, wherein said additional fixed delay operates to provide a maximum allowable delay within said adaptive jitter buffer of less than 250 ms.

35. The method of claim 26 further comprising a step of disabling of echo cancellers within a switched portion of said packet network.

36. The method of claim 35, wherein said step of disabling of said echo cancellers is performed within a least one gateway.

37. The method of claim 26 further comprising a step of optimizing data packet length.

38. The method of claim 26 further comprising a step of processing of actual packet data including missing packets.

39. The method of claim 26 further comprising a step of reconstructing missing packet data using interpolation.

40. A method of reconfiguring a first gateway device in voice mode configuration to data mode configuration, said first gateway device being in communication with a second gateway device over a packet network, said first gateway device being in communication with a first endpoint device over a first telephone line and said second gateway device being in communication with a second endpoint device over a second telephone line, said first gateway device including a jitter buffer, said method comprising:
- determining whether a signal received by said first gateway device, in said voice mode configuration, is a voice signal or a data signal; and
- configuring said first gateway device to said data mode configuration if said determining determines that said signal is said data signal;
- wherein said jitter buffer has a different configuration in said data mode configuration than in said voice mode configuration, and wherein said different configuration includes said jitter buffer having a dynamic size in said voice mode configuration and having a fixed size in said data mode configuration.

41. The method of claim 40, wherein said jitter buffer causes a jitter buffer delay, and wherein in said data mode configuration, an extra delay is added to said jitter buffer delay.

42. The method of claim 41, wherein said determining further determines whether said data signal indicates a non-echo canceling data modulation or an echo canceling data modulation, and said configuring sets said extra delay to be higher for said non-echo canceling data modulation than for said echo canceling data modulation.

43. The method of claim 41, wherein said extra delay is defined based on a maximum allowable delay by said first endpoint device.

44. A first gateway device for use in voice mode configuration and data mode configuration, said first gateway device being in communication with a second gateway device over a packet network, said first gateway device being in communication with a first endpoint device over a first telephone line and said second gateway device being in communication with a second endpoint device over a second telephone line, said first gateway device comprising:
- a processor capable of determining whether a signal received by said first gateway device, in said voice mode configuration, is a voice signal or a data signal, and configuring said first gateway device to said data mode configuration if said determining determines that said signal is said data signal; and
- a jitter buffer, wherein said jitter buffer is configured by said processor to have a different configuration in said data mode configuration than in said voice mode configuration, and wherein said different configuration includes said jitter buffer having a dynamic size in said voice mode configuration and having a fixed size in said data mode configuration.

45. The first gateway device of claim 44, wherein said jitter buffer causes a jitter buffer delay, and wherein in said data mode configuration, an extra delay is added to said jitter buffer delay.

46. The first gateway device of claim 45, wherein said processor further determines whether said data signal indicates a non-echo canceling data modulation or an echo canceling data modulation, and configures said extra delay to be higher for said non-echo canceling data modulation than for said echo canceling data modulation.

47. The first gateway device of claim 45, wherein said extra delay is defined based on a maximum allowable delay by said first endpoint device.

* * * * *